US011560728B2

(12) United States Patent
Sandegren et al.

(10) Patent No.: US 11,560,728 B2
(45) Date of Patent: Jan. 24, 2023

(54) TOOL, A SYSTEM AND A METHOD FOR MANUFACTURING OF A REINFORCEMENT BAR STRUCTURE

(71) Applicant: SKANSKA SVERIGE AB, Stockholm (SE)

(72) Inventors: Anton Sandegren, Eskilstuna (SE); Erik Viström, Västerås (SE)

(73) Assignee: SKANSKA SVERIGE AB, Stockholm (SE)

(*) Notice: Subject to any disclaimer, the term of this patent is extended or adjusted under 35 U.S.C. 154(b) by 457 days.

(21) Appl. No.: 16/643,594

(22) PCT Filed: Aug. 28, 2018

(86) PCT No.: PCT/EP2018/073084
§ 371 (c)(1),
(2) Date: Mar. 2, 2020

(87) PCT Pub. No.: WO2019/048289
PCT Pub. Date: Mar. 14, 2019

(65) Prior Publication Data
US 2021/0156159 A1 May 27, 2021

(30) Foreign Application Priority Data
Sep. 8, 2017 (SE) .................................... 1751088-4

(51) Int. Cl.
E04G 21/12 (2006.01)
B21F 15/04 (2006.01)
(Continued)

(52) U.S. Cl.
CPC ............ *E04G 21/123* (2013.01); *B21F 15/04* (2013.01); *B25J 11/005* (2013.01);
(Continued)

(58) Field of Classification Search
CPC ... E04G 21/123; E04G 21/169; E04G 19/003; B21F 15/04; B21F 23/005; B21F 27/121;
(Continued)

(56) References Cited

U.S. PATENT DOCUMENTS 4,362,192 A * 12/1982 Furlong ................. E04G 21/123
140/93.6
5,217,049 A * 6/1993 Forsyth ................. E04G 21/122
140/57
(Continued)

FOREIGN PATENT DOCUMENTS

| JP | H06-80570 U | 11/1994 |
| KR | 10-1681544 B1 | 12/2016 |
| WO | 95/05313 A1 | 2/1995 |

OTHER PUBLICATIONS

Written Opinion of the International Searching Authority dated Nov. 22, 2018 for PCT/EP2018/073084, filed on Aug. 28, 2018, 6 pages.
(Continued)

Primary Examiner — Stephen A Vu
(74) Attorney, Agent, or Firm — Xsensus LLP

(57) ABSTRACT

A tool for manufacturing of a reinforcement bar structure, wherein the tool comprises a main body, a jaw arrangement, a tying device and an arrangement configured for moving the jaw arrangement between a gripping state and a tying state. A system for manufacturing a reinforcement bar structure, wherein the system comprises a supply of reinforcement bar material, a bending apparatus, a holding apparatus and a group of robots wherein at least one robot of the group of robots is equipped with the tool for manufacturing a reinforcement bar structure. A method for transporting and attaching a reinforcement bar during manufacturing of a reinforcement bar structure using a tool comprising a main body, the method comprising gripping a reinforcement bar, tying together the reinforcement bar with another reinforce-
(Continued)

ment bar by looping a wire around the reinforcement bars, tightening the wire around the reinforcement bars, forming a knot, and cutting the wire.

20 Claims, 8 Drawing Sheets

(51) Int. Cl.
| | | |
|---|---|---|
| | *B25J 11/00* | (2006.01) |
| | *B25J 15/00* | (2006.01) |
| | *E04G 19/00* | (2006.01) |
| | *B21F 23/00* | (2006.01) |
| | *B21F 27/12* | (2006.01) |

(52) U.S. Cl.
CPC ....... *B25J 15/0019* (2013.01); *B25J 15/0028* (2013.01); *B25J 15/0066* (2013.01); *E04G 19/003* (2013.01); *B21F 23/005* (2013.01); *B21F 27/121* (2013.01)

(58) Field of Classification Search
CPC ......... B21F 27/08; B21F 27/12; B25J 11/005; B25J 15/0019; B25J 15/0028; B25J 15/0066; E04C 5/04; E04C 5/0604; E04C 5/162

See application file for complete search history.

(56) References Cited

U.S. PATENT DOCUMENTS

| | | | | |
|---|---|---|---|---|
| 5,871,036 | A | * | 2/1999 | Murayama ............ E04G 21/123 140/57 |
| 5,944,064 | A | | 8/1999 | Saito et al. |
| 5,983,473 | A | * | 11/1999 | Yuguchi ................ E04G 21/123 29/33 F |
| 6,401,766 | B1 | | 6/2002 | Ishikawa et al. |
| 9,404,275 | B2 | * | 8/2016 | Lamb .................... E04G 21/122 |

OTHER PUBLICATIONS

Canadian Office Action dated Apr. 16, 2020, issued in corresponding Canadian Patent Application No. 3074779, 5 pages.

* cited by examiner

TOOL, A SYSTEM AND A METHOD FOR MANUFACTURING OF A REINFORCEMENT BAR STRUCTURE

CROSS-REFERENCE TO RELATED APPLICATIONS

The present application is based on PCT filing PCT/EP2018/073084, filed Aug. 28, 2018, which claims priority to SE 1751088-4, filed Sep. 8, 2017, the entire contents of each are incorporated herein by reference.

TECHNICAL FIELD

The present patent application is generally related to automatic manufacturing of reinforcement bar structures, such as reinforcement bar cages. More particularly, it is related to a tool for manufacturing of a reinforcement bar structure, a system for manufacturing a reinforcement bar structure and a method for transporting and attaching a reinforcement bar during manufacturing of a reinforcement bar structure.

BACKGROUND

Today it is known to use industrial robots to build reinforcement bar cages. There are several advantages with using industrial robots for building the reinforcement bar cages, e.g. the cages can be built quicker, cost of production can be lowered and an improved control of quality can be achieved. In addition, if having the industrial robots placed on site, large reinforcement bar structures can be built efficiently since the need for truck transportation of these large reinforcement bar structures can be avoided.

By using industrial robots it is also possible to increase the complexity of the reinforcement bar structure without risking that production time and/or quality issues increase. More complex reinforcement bar structures may e.g. result in that a plurality of different sizes can be used in order optimize the cost of production.

In order to be able to build the reinforcement bar cages or other reinforcement bar structures the industrial robots are equipped with tools for holding the reinforcement bar during the transport as well as during attachment of the reinforcement bar, as well as tools for attaching the reinforcement bar to other reinforcement bars by welding or tying.

In order to be able to achieve a reliable robot-based system for manufacturing of reinforcement bar structures, reliable tools for holding and attaching reinforcement bars are part of the solution. There is thus a need for improved tools in order to be able to deliver improved systems.

SUMMARY

Accordingly, the present invention preferably seeks to mitigate, alleviate or eliminate one or more of the above-identified deficiencies in the art and disadvantages singly or in any combination and solves at least the above mentioned problems.

According to a first aspect it is provided a tool for manufacturing of a reinforcement bar structure, wherein the tool comprises a main body, a jaw arrangement comprising a first jaw partly placed in a first side section of the main body and a second jaw partly placed in a second side section of the main body, a tying device placed in a mid-section of the main body, wherein the mid-section is situated between the first side section and the second side section, wherein the tool further comprises an arrangement configured for moving the jaw arrangement between a gripping state and a tying state, wherein, in the gripping state, the first jaw and the second jaw are leaning towards one another such that a reinforcement bar can be held between a first peripheral end section of the first jaw and a second peripheral end section of the second jaw, wherein, in the tying state, the first peripheral end section and the second peripheral end section are spaced apart such that a wire can be looped around a group of reinforcement bars placed between the first and second jaw.

The first jaw and the second jaw may be provided with recesses for guiding the wire around the group of reinforcement bars during the tying state.

The first jaw may comprise a first inner section and the first peripheral end section, and the second jaw may comprise a second inner section and the second peripheral section, wherein the recesses are provided in the first and second inner sections.

The tool may further comprise a wire guiding arrangement comprising a first guider and a second guider, wherein the first guider may be placed next to the first jaw and the second guider may be placed next to the second jaw.

The first and second peripheral end sections may be hook-shaped.

The first and the second jaw may be rotatably attached to the main body.

The tying device may be configured to produce straight knots.

The first and second jaws may be spaced apart at least 90 mm during the tying state.

Wire may be fed to the tying device from a magazine via a wire tubing.

The arrangement may comprise pneumatic cylinders.

The tying device may further comprise a feeder motor arranged to feed the wire around the group of reinforcement bars during a first phase of a tying process, and a tying motor arranged to rotate a wire head such that two parts of the wire is tied together and a knot is formed in a second phase, wherein the wire head is part of the tying device.

According to a second aspect it is provided a system for manufacturing a reinforcement bar structure, wherein the system comprises a supply of reinforcement bar material, a bending apparatus for transforming the reinforcement bar material into a reinforcement bar according to a pre-set configuration, a holding apparatus for holding the reinforcement bar in a pre-set position, a group of robots configured to grip the reinforcement bar held by the holding apparatus and place the reinforcement bar at pre-set location in the manufacturing area, wherein at least one robot of the group of robots is equipped with a tool according to the first aspect and thereby further configured to tie the reinforcement bar and reinforcement bars already placed on the manufacturing area together.

The system may further comprise a gantry placed above the holding apparatus and a manufacturing area, wherein the group of robots are movably attached to the gantry.

The group of robots may comprise three robots, and wherein one of the group of robots is provided with the tool.

According to a third aspect it is provided a method for transporting and attaching a reinforcement bar during manufacturing of a reinforcement bar structure, the method comprising gripping a reinforcement bar between a first peripheral end section of a first jaw and a second peripheral end section of a second jaw by using a jaw arrangement comprising the first jaw, partly placed in a first side section of a main body, and the second jaw, partly placed in a second side section of the main body, and an arrangement configured for moving the jaw arrangement, and tying together the reinforcement bar with another reinforcement bar, together forming a group of reinforcement bars, by looping a wire around the group of reinforcement bars while having the first peripheral end section and the second peripheral end section spaced apart, tightening the wire around the group of reinforcement bars, forming a knot, and cutting the wire.

The steps of gripping a reinforcement bar and tying together the reinforcement bar with another reinforcement bar is made by using a first robot, and wherein the step of tying together the reinforcement bar with another reinforcement bar may be preceded by gripping the reinforcement bar by using a second robot, and releasing the reinforcement bar with the first robot.

BRIEF DESCRIPTION OF THE DRAWINGS

The above, as well as additional objects, features and advantages of the present invention, will be better understood through the following illustrative and non-limiting detailed description of different embodiments, with reference to the appended drawings, wherein.

DETAILED DESCRIPTION OF PREFERRED EMBODIMENTS

Figure 1:
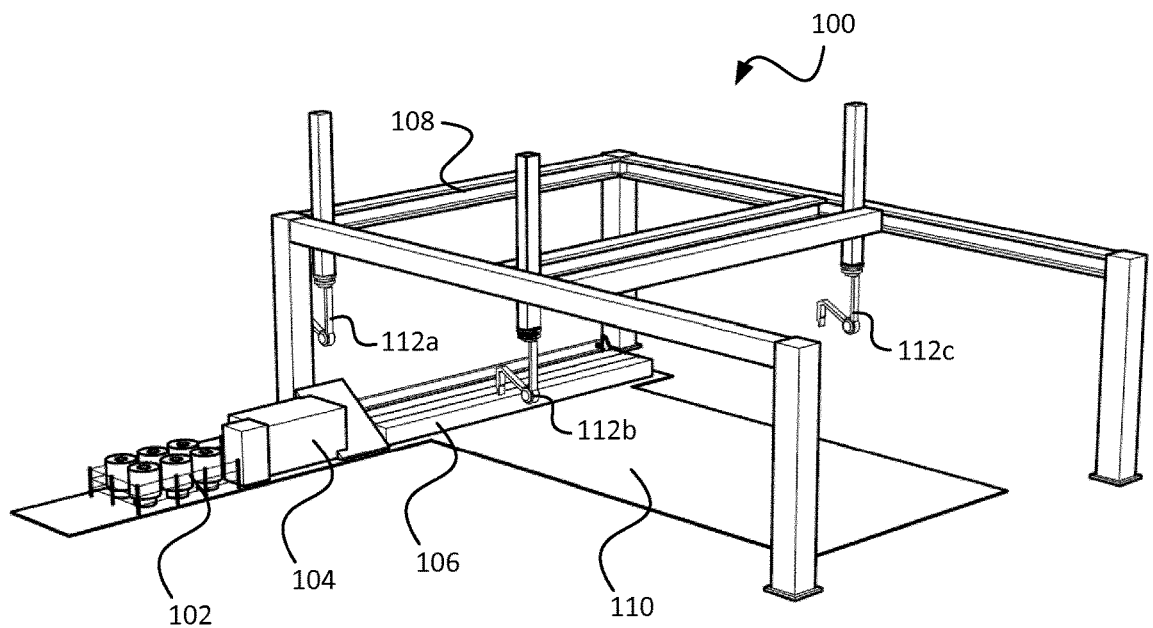
FIG. 1 illustrates a system for manufacturing a reinforcement bar structure.

FIG. 1 generally illustrates a system 100 for manufacturing a reinforcement bar structure. The system may comprise a supply of reinforcement bar material 102, e.g. rolls of reinforcement bar material in different sizes. An advantage of having rolls of reinforcement bar material is that the foot print of the system can be kept small and that the reinforcement bar material can easily be transported to the system.

In a bending apparatus 104, the reinforcement bar material can be transformed into a reinforcement bar according to a pre-set configuration. For instance, the reinforcement bar may be an L-shaped bar, U-shaped bar or any other form determined by a software used for designing the reinforcement bar structure.

After having been processed in the bending apparatus 104, the reinforcement bar is fed to a holding apparatus 106, also known as a fixture. The holding apparatus 106 serves the purpose of holding the reinforcement bar in a pre-set position.

A gantry 108 can be placed above the holding apparatus 106 and a manufacturing area 110. A group of robots 112a, 112b, 112c can be movably attached to the gantry 108. In order to move the robots 112a, 112b, 112c, motors, such as servomotors, may be used. For instance, for each of the robots, a first motor may be provided on the gantry 108 for causing a first movement in a first direction and a second motor may be provided on the gantry 108 for causing a second movement in a second direction. As illustrated, the robots 112a, 112b, 112c may be provided with a number of joints such that these can be rotated and moved in a number of different ways. The group of robots 112a, 112b, 112c can further be configured to grip the reinforcement bar held by the holding apparatus 106 and place the reinforcement bar at pre-set location in the manufacturing area 110.

The gantry 108 may be foldable such that this can easily be transported from one site to another on a truck. In order to fit a standard truck, dimensions of the gantry 108 may be adapted.

The robots 112a, 112b, 112c may in their ends be equipped with tools for gripping or tools for gripping and tying. Further, the robots 112a, 112b, 112c may be provided with a plurality of tools and a switching device such that the robots can switch between the plurality of tools.

The general process for adding the reinforcement bar to the reinforcement bar structure that is under construction may be divided into three main steps:

Step 1: Locating and gripping the reinforcement bar,

Step 2: Moving the reinforcement bar to an attachment position

Step 3: Tying the reinforcement bar together with the reinforcement bar structure In step 1, a first robot 112a, being one of the robots 112a, 112b, 112c, locates the reinforcement bar placed in the holding apparatus 106 and grips it. In order to provide for that the reinforcement bar can efficiently be moved from a position in the holding apparatus 106 to the attachment position, i.e. the position in which the reinforcement bar is to be attached to the reinforcement bar structure, the pre-set position in which the reinforcement bar is held by the holding apparatus 106 and a position of the first robot 112a that grips the reinforcement bar can be chosen by taking the attachment position into account. For instance, if possible, the pre-set position in which the reinforcement bar is held by the holding apparatus 106 and a position of the first robot 112a that grips the reinforcement bar are chosen such that the first robot 112a can have the same grip when gripping the reinforcement bar in the holding apparatus 106 as when holding the reinforcement bar in the attachment position.

In step 2, after having gripped the reinforcement bar this is transported by the first robot 112a to the attachment position, or, if needed in order to reach the attachment position, by the first robot 112a together with a second robot 112b, wherein the second robot is also part of the group of robots 112a, 112b, 112c. If the reinforcement bar needs to be gripped differently in order to reach the attachment position, the first and second robot 112a, 112b may transport the reinforcement bar together in that the first robot 112a transports the reinforcement bar to an intermediate position, the second robot 112b grips the reinforcement bar in the intermediate position, the first robot 112a releases the reinforcement bar, and the second robot 112b transports the reinforcement bar to the attachment position. If the reinforcement bar is long or in any other way unhandy for one robot to transport on its own, the first and second robot 112a, 112b may transport the reinforcement bar together by gripping different parts of it and transporting it together in full or in part from the position in the holding apparatus to the attachment position. In case two robots are not enough for handling the reinforcement bar a third robot 112c, being part of the group of robots 112a, 112b, 112c, may be used for transporting the reinforcement bar.

In step 3, when having the reinforcement bar placed in the attachment position, one of the robots 112a, 112b, 112c attaches the reinforcement bar to the reinforcement bar structure, while at least one of the other robots 112a, 112b, 112c is holding the reinforcement bar in the attachment position. An example of the step of tying the reinforcement bar together with the reinforcement bar structure is illustrated in FIG. 2.

Figure 2:
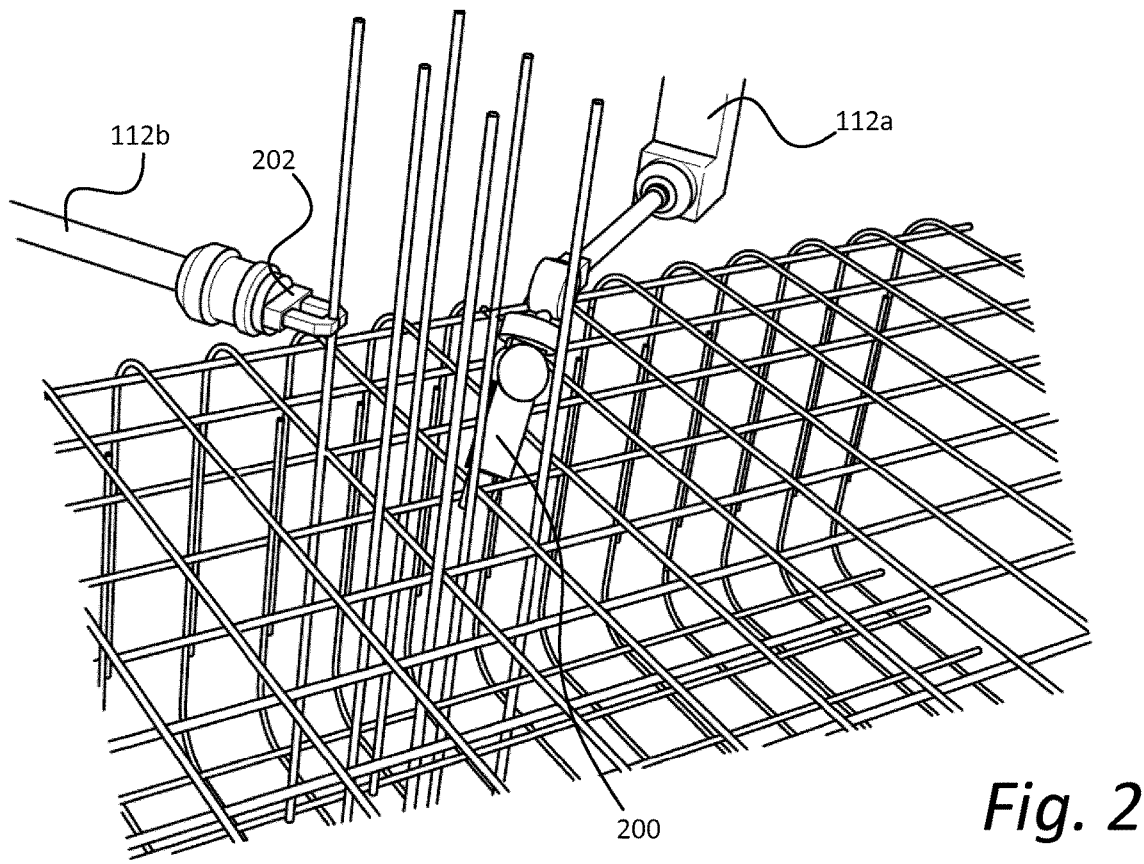
FIG. 2 illustrates robots tying a reinforcement bar to a reinforcement bar structure.

In the example illustrated in FIG. 2, the first robot 112a is equipped with a tool 200 arranged for both gripping and tying and the second robot 112b is equipped with a gripping tool 202 arranged only for gripping. As an effect of that the robots 112a, 112b, 112c can cooperate, it is only needed to have one of the robots 112a, 112b, 112c provided with a tool 200 that can be used both for gripping and tying.

A positive effect of having the tool 200, arranged for both gripping and tying, compared to having a tool arranged only for tying is that the tool 200 may also take part of the steps of locating and gripping the reinforcement bar, as well as moving the reinforcement bar to the attachment position. Since handling long reinforcement bars bended in a complex manner often requires more than than two robots for efficiently moving the reinforcement bar to the attachment position, having one of the robots 112a, 112b, 112c using the tool 200 provides for an improved performance of the system 100.

When the reinforcement bar structure 300 is finalized, it can be lifted from the manufacturing area 110 by a crane 302 to its intended place in a building under construction.

Figure 3:
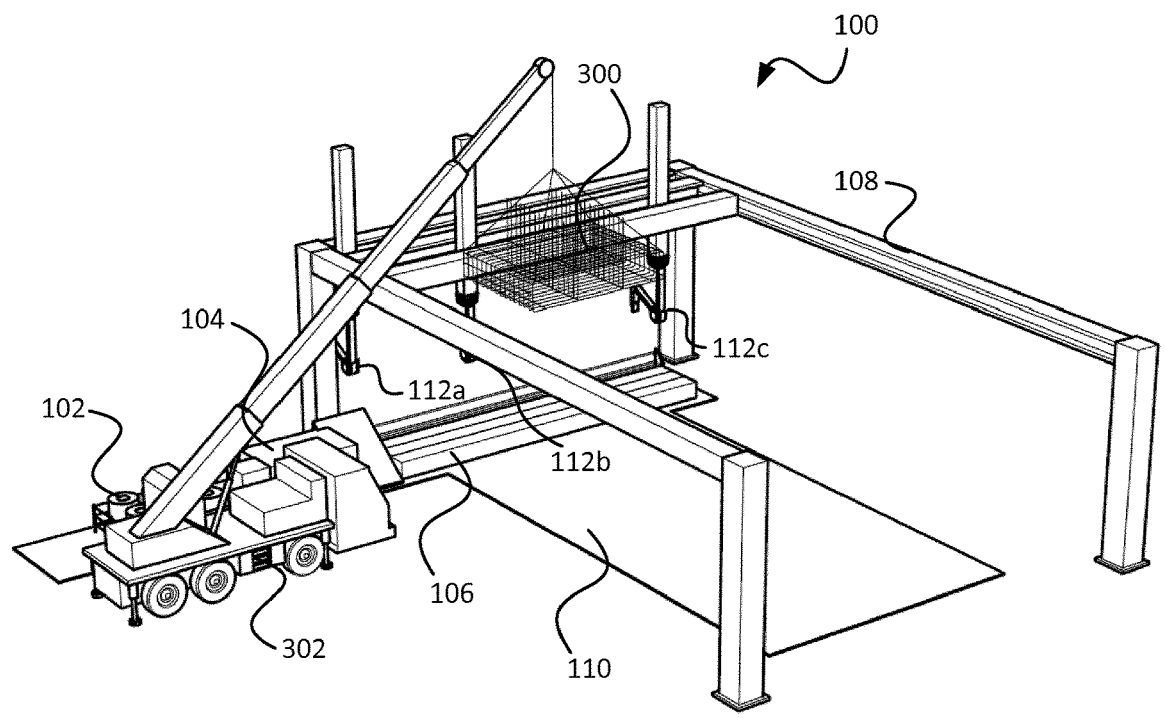
FIG. 3 illustrates the reinforcement bar structure lifted from the system by a crane.

Even though the system 100 in FIGS. 1 and 3 is illustrated with the gantry 108, the robots 112a, 112b, 112c may in an alternative embodiment be placed next to the manufacturing area 110 and, in case of a large manufacturing area, be equipped with longer arms in order to reach different parts of the manufacturing area 110. It is also possible to have part of the robots placed on the gantry and part of the robots placed next to the manufacturing area on the ground or on a truck.

Figure 4:
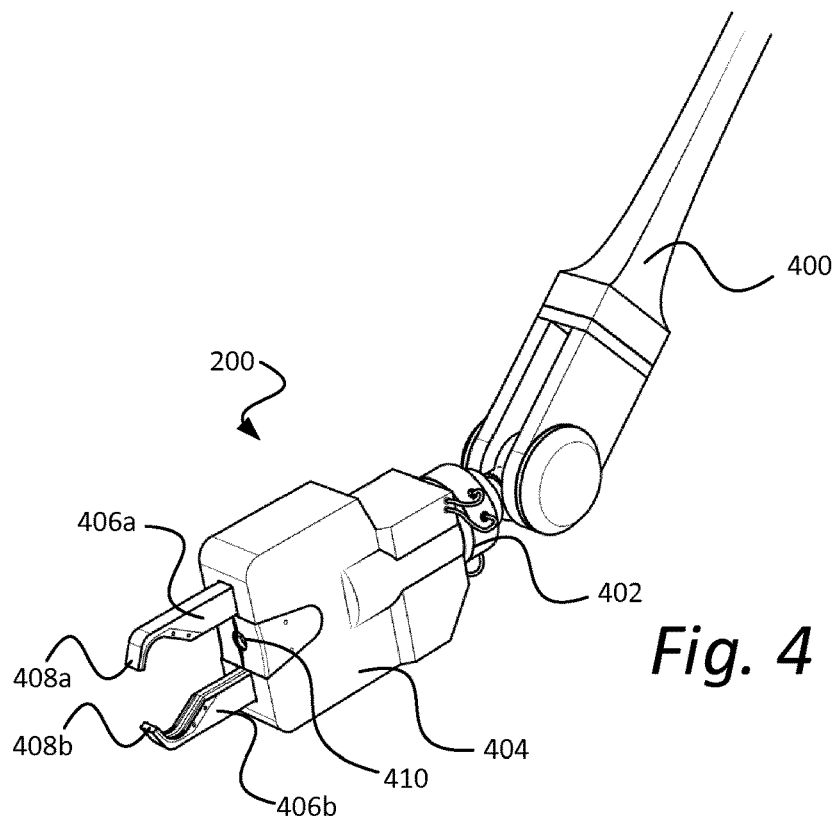
FIG. 4 illustrates a tool for gripping and tying a reinforcement bar.

In FIG. 4, another embodiment of the tool 200 is illustrated in detail. The tool 200 can be connected to a robotic arm 400 via an interface 402. Power and steering signals may be supplied via the robotic arm 400, but other alternatives are equally possible, e.g. that the steering signals are provided via a wireless interface directly to the tool from a control unit.

The tool 200 can comprise a main body 404 that is partly housing two jaws 406a, 406b, referred to as a first jaw 406a and a second jaw 406b. The jaws 406a, 406b can be provided with a first peripheral end section 408a and a second peripheral end section 408b, respectively. In the main body 404, situated between the jaws 406a, 406b, a tying device 410 can be provided.

Figure 5:
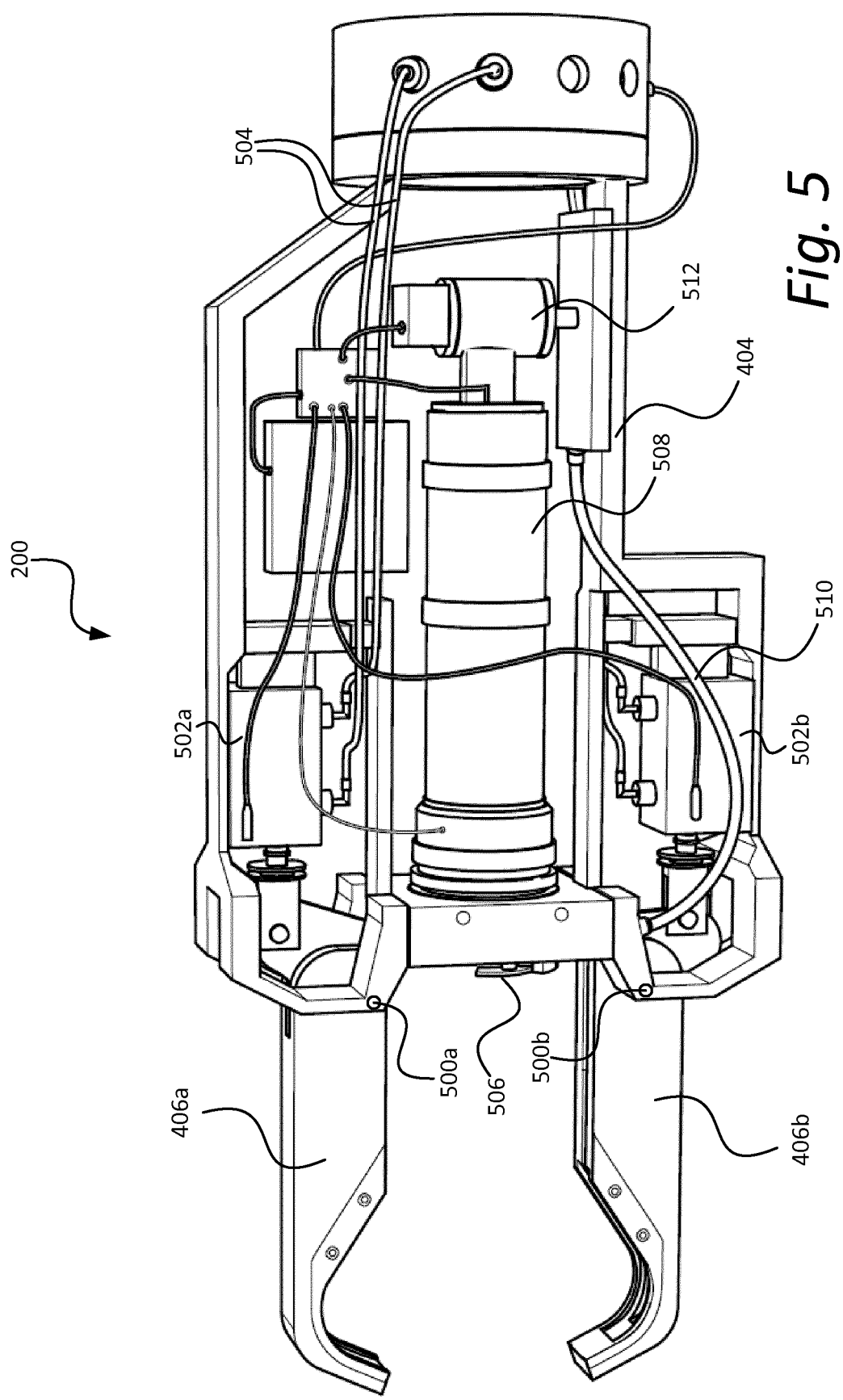
FIG. 5 illustrates the tool in further detail.

FIG. 5 illustrates the tool 200 with side sections of the main body 404 being removed. Apart from the side sections, the main body 404 can comprise a frame made of e.g. an Aluminum-based alloy. By having the main body 404 designed in this way, service of the tool is facilitated.

In order to provide for that the jaws 406a, 406b can be moved between a gripping state, in which the jaws 406a, 406b are leaning towards one another, and a tying state, in which the jaws 406a, 406b are spaced apart from each other, as illustrated in FIGS. 6 and 7a, 7b, 7c, the jaws 406a, 406b can be attached to the main body 404 in a first point of rotation 500a and a second point of rotation 500b, respectively. Having the jaws 406a, 406b attached to the main body in this way and connected to a first pneumatic cylinder 502a and a second pneumatic cylinder 502b, respectively, the jaws 406a, 406b can be controlled by activating and deactivating the first and second pneumatic cylinders 502a, 502b. Air can be provided to the first and second pneumatic cylinders 502a, 502b via a tube arrangement 504. Instead of using pneumatic cylinders, as illustrated, the first and second jaw 406a, 406b can be controlled by using servomotors or any other suitable motor arrangement.

The tying device used for attaching the reinforcement bar together with the reinforcement bar structure comprises a wire head 506 facing an area in which the reinforcement bar is placed during the tying state. During the tying state the wire head 506 can be rotated by a wire head motor 508, which may be a servomotor. Wire can be fed to the wire head 506 from a magazine, placed locally within the main body or externally, via a wire tubing 510 by a wire feeder motor 512, which also may be a servomotor. In order to switch from rotating the wire head 506 with the wire head motor 508 to feeding wire using the wire feeder motor 512 an electrical clutch can be used.

Figure 6:
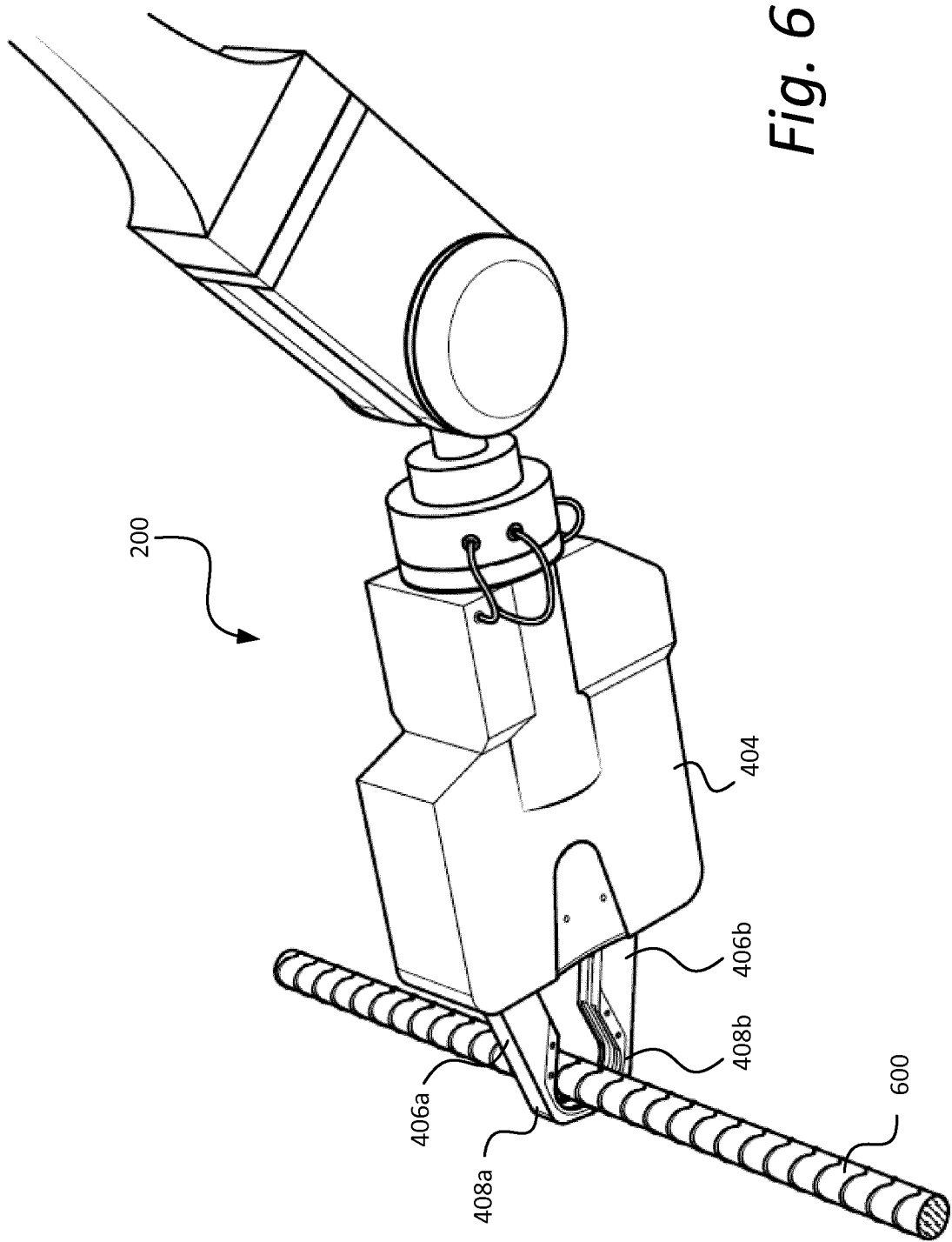
FIG. 6 illustrates the tool in a gripping state.

In FIG. 6, the tool 200 in the gripping state is illustrated. A reinforcement bar 600 is gripped between the first peripheral end section 408a of the first jaw 406a and the second peripheral end section 408b of the second jaw 406b.

Figure 7A:
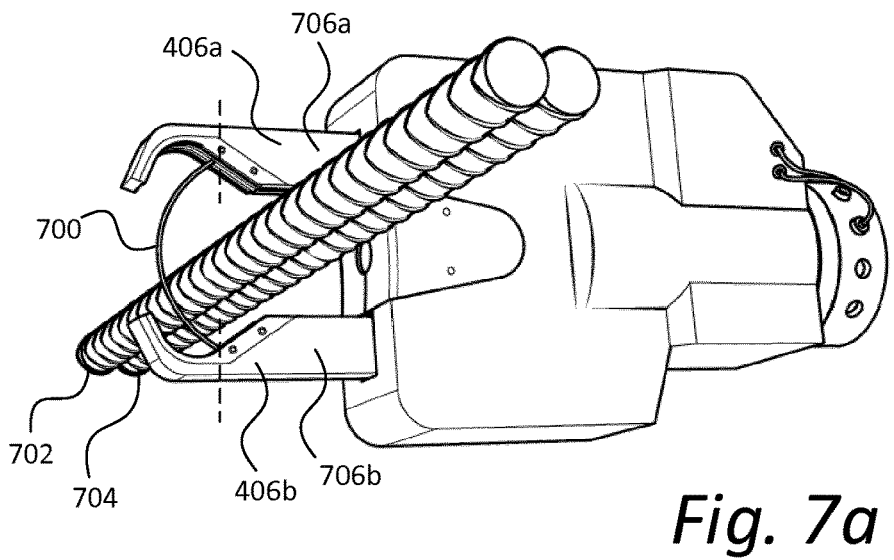
FIG. 7a-c illustrates the tool in a tying state.
Figure 7B:
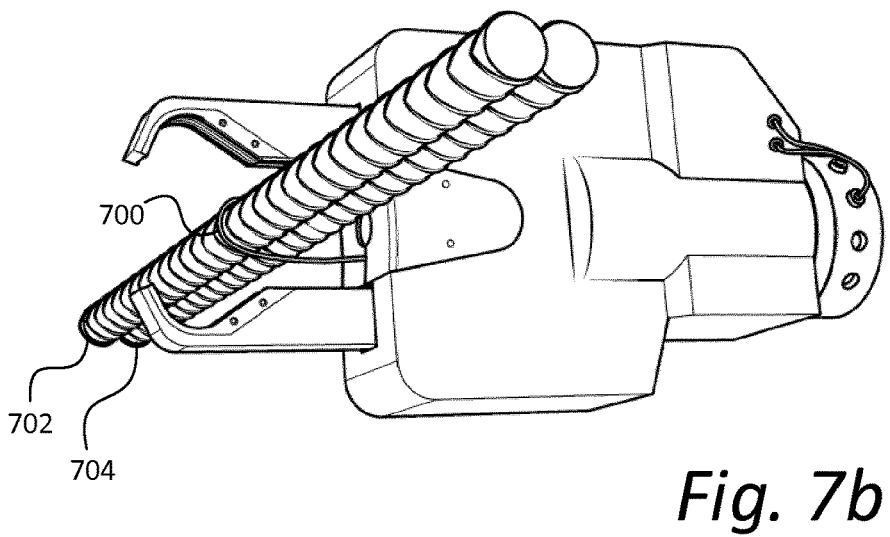
Figure 7C:
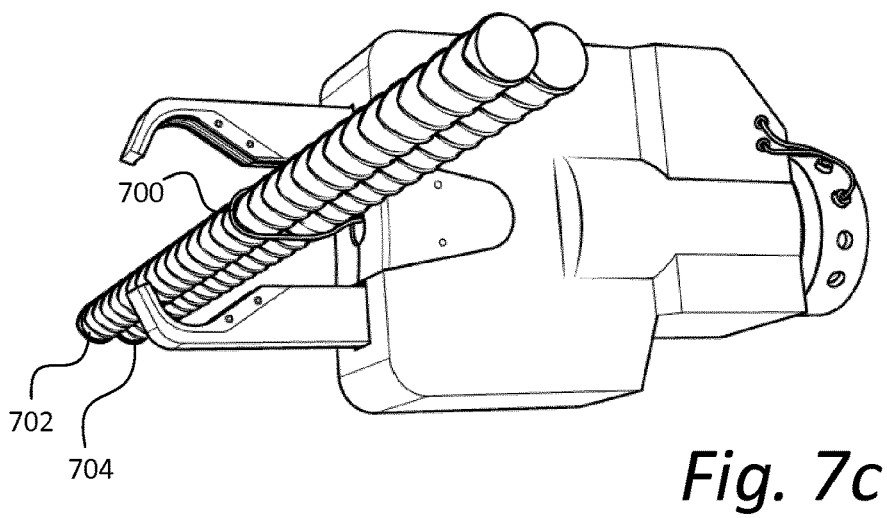

In FIGS. 7a, 7b and 7c, it is illustrated three steps of a tying process together forming the tying state used by the tool 200.

In a first step A, illustrated in FIG. 7a, a wire 700 is looped around two reinforcement bars 702, 704. In order to guide the wire 700 recesses 800a, 800b (illustrated in FIG. 8) may be provided in the first and second jaw 406a, 406b. More particularly, the recesses may be provided in a first inner section 706a of the first jaw 406a and in a second inner section 706b of the second jaw 406b. During this step the wire head 506 may be locked in position.

In a second step B, illustrated in FIG. 7b, the wire 700 can be tightened around the reinforcement bars 702, 704. When having the wire 700 tightened to a threshold level the process enters a third step C.

Figure 9:
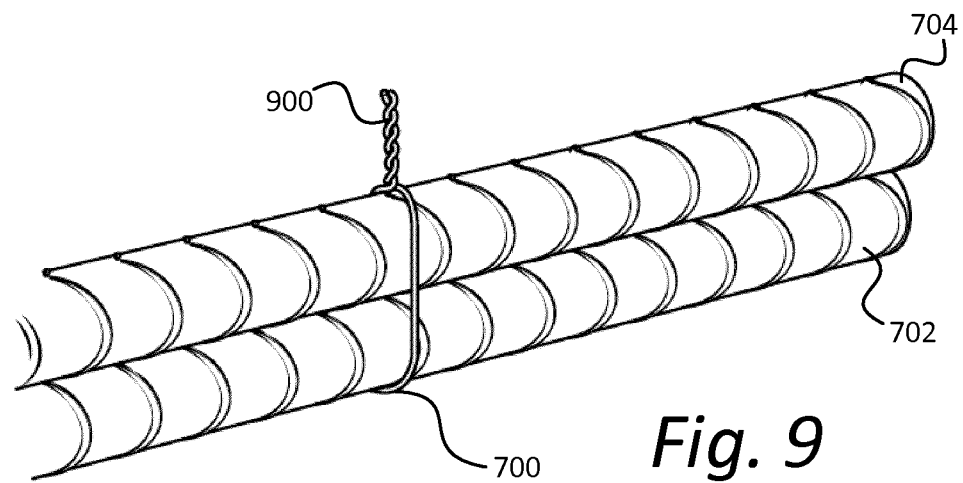
FIG. 9 illustrates two reinforcement bars tied together.

In the third step C, illustrated in FIG. 7c, a knot 900, illustrated in FIG. 9, is formed by rotating the wire head 506 such that two parts of the wire 700 is twisted around each other. After having formed the knot the wire is cut by a cutting element in the wire head 506.

Figure 8:
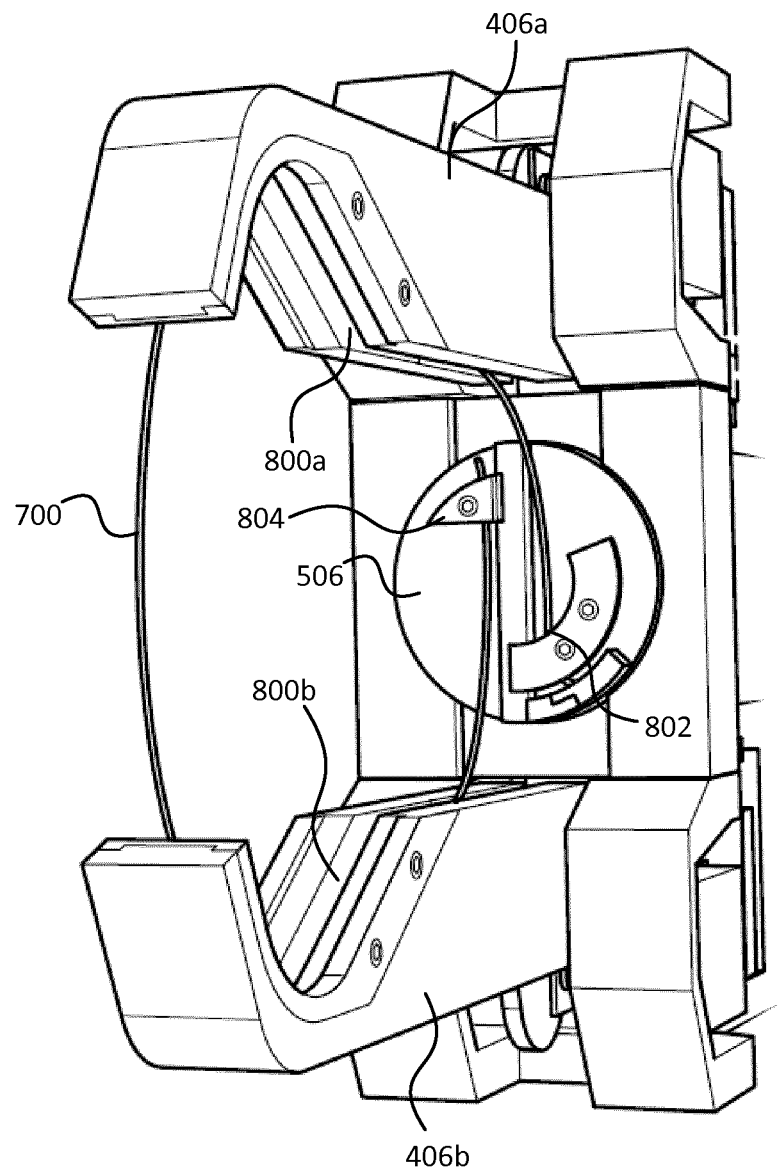
FIG. 8 illustrates a front view of the tool during the tying state.

FIG. 8 illustrates the first step A of the tying process from a different view and without the reinforcement bars 702, 704 placed in front of the wire head 506. The wire 700 can be fed from a wire infeed 802 of the wire head 506 via a recess 800a of the first jaw 406a and a recess 800b of the second jaw 406b to a wire end holder 804 of the wire head 506.

FIG. 9 illustrates the reinforcement bars 702, 704 attached together by the wire 700 and the knot 900. The knot 900 is a so-called straight knot, which means that a first and a second end of the wire 700 is twisted around each other while holding the first and second end stretched such that a protruding part is formed.

Figure 10:
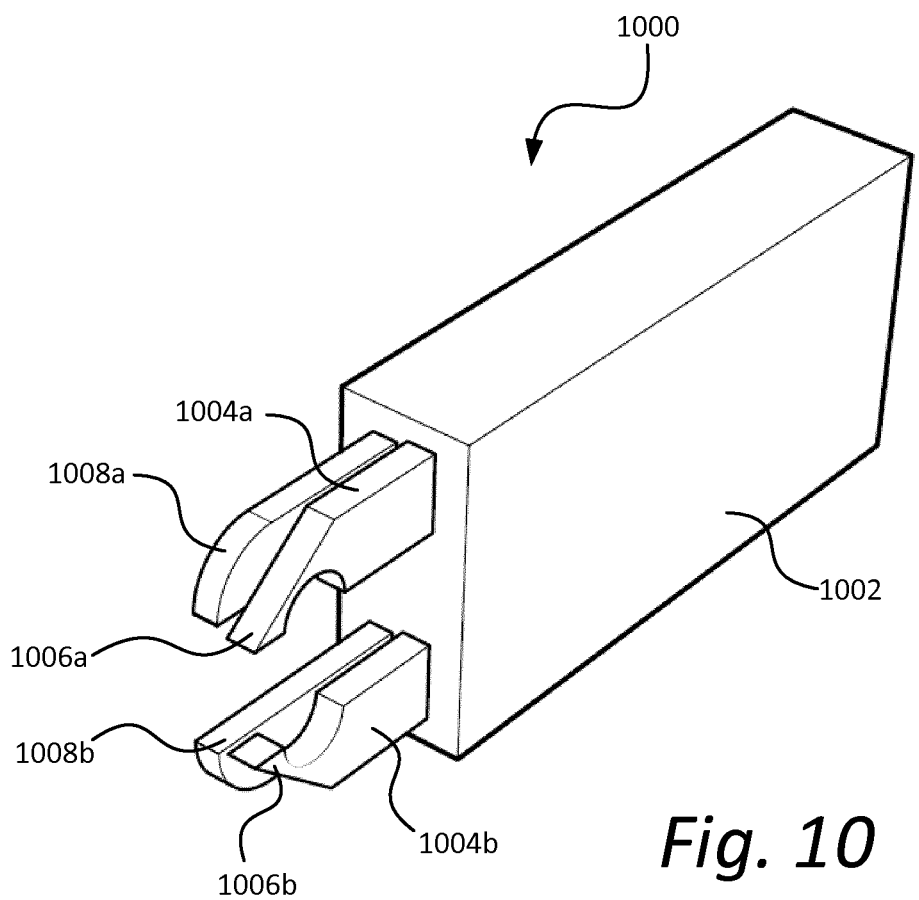
FIG. 10 illustrates an alternative embodiment of the tool.

As described above and illustrated in FIG. 8, the first and second jaws 406a, 406b may be provided with the recesses 800a, 800b in order to guide the wire during the tying process. Alternatively, as schematically illustrated in FIG. 10, a tool 1000 for gripping and tying can be provided that comprises a main body 1002 and a first and a second jaw 1004a, 1004b provided with a first and second end section 1006a, 1006b, respectively, that has the same functionality for gripping as the tool 200 illustrated in FIGS. 4 to 8. However, instead of having the first and second jaw 1006a, 1006b of the tool 1000 provided with recesses for guiding the wire during the tying process a first and a second guider 1008a, 1008b can be provided with recesses for guiding the wire.

Figure 11:
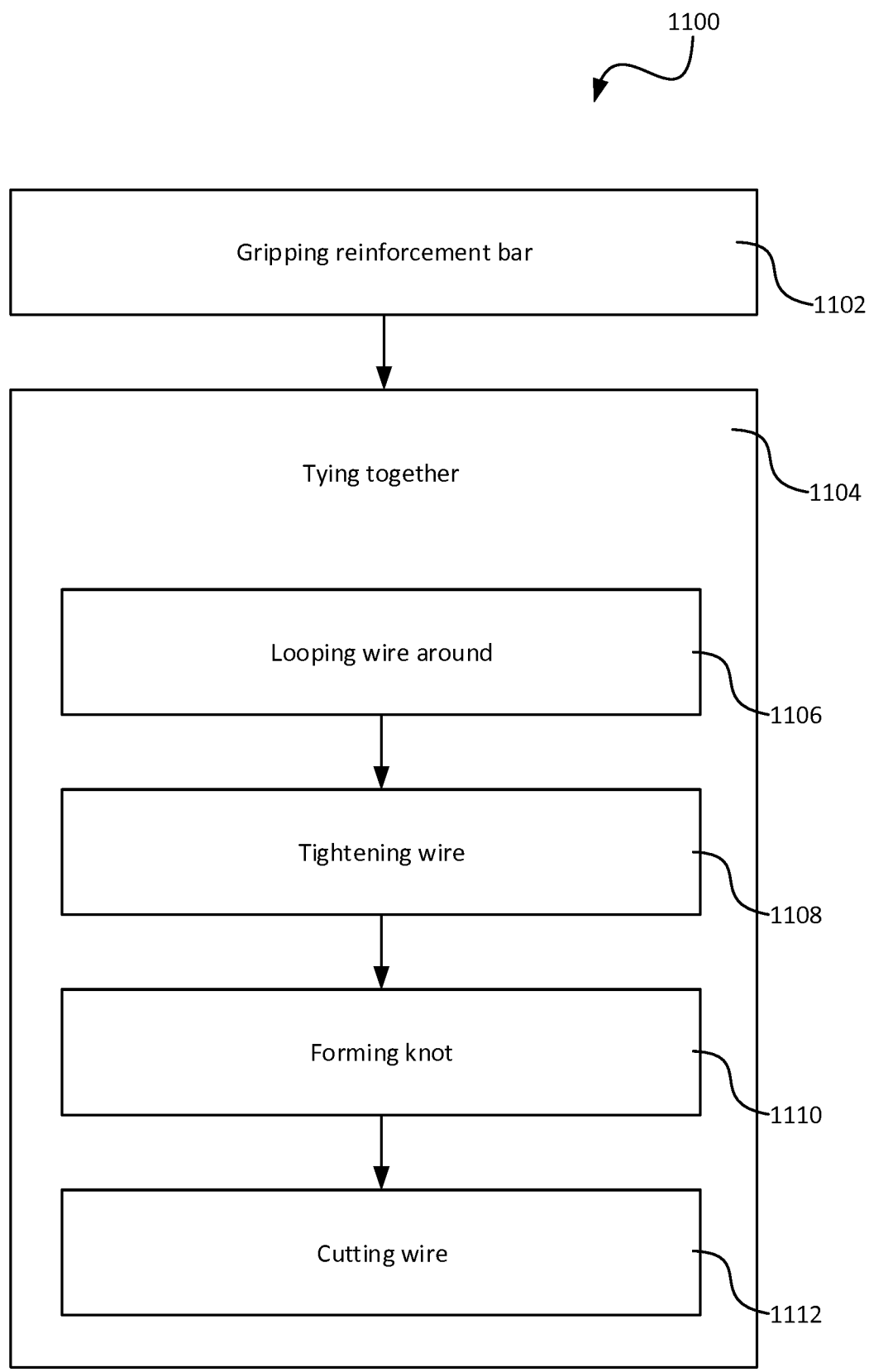
FIG. 11 illustrates a flowchart of a method for gripping reinforcement bar and tying the reinforcement bar to a reinforcement bar structure.

FIG. 11 illustrates a flowchart of a method for transporting and attaching a reinforcement bar during manufacturing of a reinforcement bar structure.

In a first step 1102 the reinforcement bar can be gripped between a first peripheral end section 408a of a first jaw 406a and a second peripheral end section 408b of a second jaw 406b by using a jaw arrangement comprising the first jaw 406a, partly placed in a first side section of a main body 404, and the second jaw 406b, partly placed in a second side section of the main body 404, and an arrangement 502a, 502b configured for moving the jaw arrangement.

In a second step 1104 the reinforcement bar 702 can be tied together with another reinforcement bar 704, together forming a group of reinforcement bars, in three sub-step.

In a first sub-step 1106 a wire 700 can be looped around the group of reinforcement bars 702, 704 while having the first peripheral end section 408a and the second peripheral end section 408b spaced apart.

In a second sub-step 1108 the wire 700 is tightened around the group of reinforcement bars 702, 704.

In a third sub-step 1110 a knot can be formed, and in a fourth sub-step 1112 the wire is cut.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A tool for manufacturing of a reinforcement bar structure, wherein the tool comprises
a main body,
a jaw arrangement comprising a first jaw partly placed in a first side section of the main body and a second jaw partly placed in a second side section of the main body,
a tying device placed in a mid-section of the main body, wherein the mid-section is situated between the first side section and the second side section,
a mechanical arrangement that moves the jaw arrangement between a gripping state and a tying state,
wherein, in the gripping state, the first jaw and the second jaw are leaning towards one another such that a reinforcement bar can be held between a first peripheral end section of the first jaw and a second peripheral end section of the second jaw,
wherein, in the tying state, the first peripheral end section and the second peripheral end section are spaced apart such that a wire can be looped around a group of reinforcement bars placed between the first and second jaw,
wherein the first jaw and the second jaw are provided with recesses for guiding the wire around the group of reinforcement bars during the tying state.

2. The tool according to claim 1, wherein the first jaw comprises a first inner section and the first peripheral end section, and the second jaw comprises a second inner section and the second peripheral section, wherein the recesses are provided in the first and second inner sections.

3. The tool according to claim 1, wherein the tool further comprises
a wire guiding arrangement comprising a first guider and a second guider, wherein the first guider is placed next to the first jaw and the second guider is placed next to the second jaw.

4. The tool according to claim 1, wherein the first and second peripheral end sections are hook-shaped.

5. The tool according to claim 1, wherein the first and the second jaw are rotatably attached to the main body.

6. The tool according to claim 1, wherein the tying device is configured to produce straight knots.

7. The tool according to claim 1, wherein, during the tying state, the first and second jaws are spaced apart in an inclusive range of at least 90 mm and less than a maximum spacing accommodated by the main body.

8. The tool according to claim 1, wherein wire is fed to the tying device from a magazine via a wire tubing.

9. The tool according to claim 1, wherein the mechanical arrangement comprises pneumatic cylinders.

10. The tool according to claim 1, wherein the tying device comprises
a feeder motor arranged to feed the wire around the group of reinforcement bars during a first phase of a tying process, and
a tying motor arranged to rotate a wire head such that two parts of the wire is tied together and a knot is formed in a second phase, wherein the wire head is part of the tying device.

11. A system for manufacturing a reinforcement bar structure, wherein the system comprises
a supply of reinforcement bar material,
a bending apparatus for transforming the reinforcement bar material into a reinforcement bar according to a pre-set configuration,
a holding apparatus for holding the reinforcement bar in a pre-set position,
a group of robots configured to grip the reinforcement bar held by the holding apparatus and place the reinforcement bar at pre-set location in a manufacturing area,
wherein at least one robot of the group of robots is equipped with a tool according to claim 1 and thereby further configured to tie the reinforcement bar and reinforcement bars already placed on the manufacturing area together.

12. The system according to claim 11, further comprising a gantry placed above the holding apparatus and a manufacturing area, wherein the group of robots are movably attached to the gantry.

13. The system according to claim 11, wherein the group of robots comprises three robots, and wherein one of the group of robots is provided with the tool.

14. A method for transporting and attaching a reinforcement bar during manufacturing of a reinforcement bar structure using a tool comprising a main body, the method comprising
gripping, by the tool, a reinforcement bar between a first peripheral end section of a first jaw and a second peripheral end section of a second jaw by using a jaw arrangement comprising the first jaw, partly placed in a first side section of the main body, and the second jaw, partly placed in a second side section of the main body, and a mechanical arrangement that moves the jaw arrangement, and
tying together, by a tying device of the tool, placed in a mid-section of the main body, wherein the mid-section is situated between the first side section and the second side section, the reinforcement bar with another reinforcement bar, together forming a group of reinforcement bars, by
looping a wire around the group of reinforcement bars while having the first peripheral end section and the second peripheral end section spaced apart,
tightening the wire around the group of reinforcement bars,
forming a knot, and
cutting the wire,
wherein gripping, by the tool, the reinforcement bar and tying together, by the tying device of the tool, the reinforcement bar with another reinforcement bar are made by using a first robot, and
wherein tying together, by the tying device of the tool, the reinforcement bar with another reinforcement bar is preceded by
gripping the reinforcement bar by using a second robot, and
releasing the reinforcement bar with the first robot.

15. A tool for manufacturing of a reinforcement bar structure, wherein the tool comprises
a main body,
a jaw arrangement comprising a first jaw partly placed in a first side section of the main body and a second jaw partly placed in a second side section of the main body,
a tying device placed in a mid-section of the main body, wherein the mid-section is situated between the first side section and the second side section,
characterized in that
the tool further comprises
an arrangement configured for moving the jaw arrangement between a gripping state and a tying state,
wherein, in the gripping state, the first jaw and the second jaw are leaning towards one another such that a reinforcement bar can be held between a first peripheral end section of the first jaw and a second peripheral end section of the second jaw,
wherein, in the tying state, the first peripheral end section and the second peripheral end section are spaced apart such that a wire can be looped around a group of reinforcement bars placed between the first and second jaw, and
wherein the tool further comprises a wire guiding arrangement comprising a first guider and a second guider, wherein the first guider is placed next to the first jaw and the second guider is placed next to the second jaw.

16. The tool according to claim 15, wherein wire is fed to the tying device from a magazine via a wire tubing.

17. The tool according to claim 15, wherein the first jaw and the second jaw are provided with recesses for guiding the wire around the group of reinforcement bars during the tying state.

18. A tool for manufacturing of a reinforcement bar structure, wherein the tool comprises
a main body,
a jaw arrangement comprising a first jaw partly placed in a first side section of the main body and a second jaw partly placed in a second side section of the main body,
a tying device placed in a mid-section of the main body, wherein the mid-section is situated between the first side section and the second side section,
characterized in that
the tool further comprises
an arrangement configured for moving the jaw arrangement between a gripping state and a tying state,
wherein, in the gripping state, the first jaw and the second jaw are leaning towards one another such that a reinforcement bar can be held between a first peripheral end section of the first jaw and a second peripheral end section of the second jaw,
wherein, in the tying state, the first peripheral end section and the second peripheral end section are spaced apart such that a wire can be looped around a group of reinforcement bars placed between the first and second jaw, and
wherein wire is fed to the tying device from a magazine via a wire tubing.

19. The tool according to claim 18, wherein the tool further comprises
a wire guiding arrangement comprising a first guider and a second guider, wherein the first guider is placed next to the first jaw and the second guider is placed next to the second jaw.

20. The tool according to claim 18, wherein the first jaw and the second jaw are provided with recesses for guiding the wire around the group of reinforcement bars during the tying state.

* * * * *